United States Patent
Saito et al.

(10) Patent No.: US 9,751,488 B1
(45) Date of Patent: Sep. 5, 2017

(54) VEHICLE SEAT

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventors: Takao Saito, Toyota (JP); Kunihiko Kondo, Nagoya (JP); Takahiro Yasuda, Toyota (JP); Kazuyuki Shiga, Nisshin (JP)

(73) Assignees: TOYOTA BOSHOKU KABUSHIKI KAISHA, Aichi-Ken (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/601,481

(22) Filed: May 22, 2017

Related U.S. Application Data (63) Continuation of application No. 14/922,956, filed on Oct. 26, 2015, now Pat. No. 9,688,231.

(30) Foreign Application Priority Data

Oct. 28, 2014 (JP) ................... 2014-219429

(51) Int. Cl.
*B60R 21/207* (2006.01)
*B60R 21/217* (2011.01)
(Continued)

(52) U.S. Cl.
CPC .............. *B60R 21/207* (2013.01); *B60N 2/42* (2013.01); *B60R 21/2176* (2013.01); *B60N 2002/5808* (2013.01)

(58) Field of Classification Search
CPC .......... B60R 21/207; B60R 2021/2076; B60N 2002/5808
See application file for complete search history.

(56) References Cited

U.S. PATENT DOCUMENTS 5,967,603 A 10/1999 Genders et al.
6,439,597 B1 * 8/2002 Harada ................. B60R 21/207
280/728.2

(Continued)

FOREIGN PATENT DOCUMENTS

EP 2 322 392 5/2011
FR EP 2322392 A1 * 5/2011 ........... B60R 21/207
(Continued)

OTHER PUBLICATIONS

Official Action, along with English-language translation thereof, for JP 2014-219429 dated Sep. 6, 2016.
(Continued)

*Primary Examiner* — Ruth Ilan
(74) *Attorney, Agent, or Firm* — Greenblum & Bernstein, P.L.C.

(57) ABSTRACT

A vehicle seat includes: a seat frame; a seat cover provided with a rupture portion; an airbag disposed in the seat; a pair of webbings provided so as to surround the airbag on a back surface side of the seat cover, one end sides of the webbings being mounted to the rupture portion; and a mounting section mounting the other end sides of the webbings to the seat frame. In a vehicle collision, the airbag is protruded out of the seat by rupturing and opening the rupture portion. The mounting section is provided at a place where a body of the seat frame is disposed. When the airbag is uninflated, the mounting section holds the other ends of the webbings apart from the body of the seat frame, and an inhibition portion in the mounting section inhibits contact between an edge-shaped portion formed in the body and the webbings.

5 Claims, 5 Drawing Sheets

(51) Int. Cl.
*B60N 2/42* (2006.01)
*B60N 2/58* (2006.01)

(56) References Cited

U.S. PATENT DOCUMENTS

| | | | | |
|---|---|---|---|---|
| 2002/0063452 A1* | 5/2002 | Harada | ................ | B60N 2/5825 |
| | | | | 297/216.13 |
| 2006/0131848 A1* | 6/2006 | Miyake | ................ | B60R 21/207 |
| | | | | 280/730.2 |
| 2013/0320743 A1* | 12/2013 | Sakamoto | ................ | B60N 2/64 |
| | | | | 297/452.48 |
| 2014/0291974 A1* | 10/2014 | Nii | ................ | B60R 21/207 |
| | | | | 280/730.1 |
| 2015/0076802 A1* | 3/2015 | Tanabe | ................ | B60N 2/68 |
| | | | | 280/730.2 |

FOREIGN PATENT DOCUMENTS

| | | |
|---|---|---|
| JP | 2011-178269 | 9/2011 |
| JP | 2011178269 A * | 9/2011 |
| JP | 2012-218666 | 11/2012 |
| JP | WO 2013081020 A1 * | 6/2013 ........... B60R 21/207 |
| JP | 2013-169954 | 9/2013 |
| WO | 98/21063 | 5/1998 |
| WO | 2013/081020 | 6/2013 |

OTHER PUBLICATIONS

Macmillan Dictionary online definition of "along", Web page: http://www.macmillandictionary.com/dictionary/american/along, 2 page, Apr. 26, 2012, retrieved from Internet Archive Way Back Machine http://web.archive.org/web/20120426062702/http://www.macmillandictionary.com/dictionary/american/along.

\* cited by examiner

VEHICLE SEAT

CROSS REFERENCE TO RELATED APPLICATIONS

The present application is a continuation application of U.S. patent application Ser. No. 14/922,956, filed on Oct. 26, 2015, which claims the benefit of Japanese Application No. 2014-219429, filed Oct. 28, 2014. The disclosure of each of these documents, including the specification, drawings, and claims, is incorporated herein by reference in its entirety.

INCORPORATION BY REFERENCE

The disclosure of Japanese Patent Application No. 2014-219429 filed on Oct. 28, 2014 including the specification, drawings and abstract is incorporated herein by reference in its entirety.

BACKGROUND OF THE INVENTION

1. Field of the Invention

The invention relates to a vehicle seat including a seat frame, a seat cover, an airbag in the seat, and a pair of webbings.

2. Description of Related Art

As this type of vehicle seat, a vehicle seat including a seat frame, a seat pad, a seat cover, an airbag, and a deployment force concentrating cover has been disclosed (see U.S. Pat. No. 5,967,603). The seat frame is a metal frame body that forms a seat framework. A portion that forms a side framework has a plate shape (a substantially horizontal-U shape in sectional view). The seat pad is a member that forms a seat outer shape (typically made of foamed resin). The seat cover is a bag-shaped member that covers the seat pad. A seam that is easier to tear than another portion is formed on a seating side of the seat cover. The airbag is a bag body that is inflatable by air flowing therein or gas supplied thereto. The airbag is mounted to the seat frame, and is disposed on a back surface side of the seat pad in a seat side portion.

The deployment force concentrating cover has a pair of band-shaped members (an example of a webbing of the invention) and hooks (resin members having a substantially J shape). In a known technique, the pair of band-shaped members are provided so as to surround the airbag while extending in a seat front-rear direction on a back surface side of the seat cover. At this time, one of the band-shaped members is disposed on an inner side of the seat with respect to the airbag, and one end side of the one band-shaped member is mounted to the seating side (close to the seam) of the seat cover. The other of the band-shaped members is disposed on an outer side of the seat with respect to the airbag, and one end side of the other band-shaped member is similarly mounted to a position close to the seam. With the airbag being surrounded by the pair of band-shaped members, the other end sides of the band-shaped members are guided to a rear side of the airbag (a position adjacent to the plate-shaped seat frame) as viewed in the seat front-rear direction. By hooking together the hooks mounted at the other ends of the band-shaped members (engaging end portions of the band-shaped members with each other) in the above state, the deployment force concentrating cover can be disposed in the seat side portion.

In the disclosed technique, in an event of a vehicle collision, the airbag in the seat inflates to tear the seat cover (the seam on the seating side), so that the airbag is protruded out of the seat. At this time, by tearing (opening) the seam of the seat cover by strain of the deployment force concentrating cover, the airbag can be protruded out of the seat.

SUMMARY OF THE INVENTION

By the way, in the disclosed technique, the pair of band-shaped members (webbings) are arranged adjacent to the plate-shaped seat frame. The other ends (the end portions) of the band-shaped members are engaged with each other via the hooks, and are disposed so as not to be mounted to the seat frame. Thus, the other ends of the band-shaped members can be contacted with and separated from the seat frame. Thus, the disclosed technique has a configuration with slightly deteriorated seat performance due to repetitive contact and separation between the seat frame and the end portion of each of the band-shaped members. That is, in the above configuration, when the seat frame and the hook are contacted with and separated from each other, abnormal noise (collision noise) may be generated. Also, a body of the band-shaped member may be forcefully contacted with an end portion (an edge-shaped plate portion) of the seat frame, and may be thereby damaged. The invention provides a vehicle seat in which end portions of a pair of webbings can be effectively mounted to a seat frame.

A vehicle seat according to an aspect of the invention includes: a seat frame that forms a seat framework; a seat cover that covers the seat frame and is provided with a rupture portion; an air bag that is disposed in the seat; a pair of webbings that are provided so as to surround the airbag on a back surface side of the seat cover, one end side of each of the webbings being mounted to the rupture portion; and a mounting section that mounts the other end side of each of the webbings to the seat frame. In an event of a vehicle collision, the airbag is protruded out of the seat by rupturing and opening the rupture portion by strain of the pair of webbings along with inflation of the airbag. In this type of configuration, it is desirable that end portions of the pair of webbings are effectively mounted to the seat frame.

Thus, in the aspect of the invention, the mounting section is provided at a place where a body of the seat frame is disposed. When the airbag is uninflated, the mounting section holds the other ends of the pair of webbings apart from the body of the seat frame, and an inhibition portion provided in the mounting section inhibits contact between an edge-shaped portion formed in the body of the seat frame and each of the webbings. In the above aspect, the other ends of the pair of webbings are held apart from the body of the seat frame by the mounting section provided at the seat frame. Accordingly, it is possible to suitably suppress generation of abnormal noise caused by contact and separation between the body of the seat frame and the end portion (for example, a resin member on the end portion side) of each of the webbings. It is also possible to suitably suppress damage to the respective webbings by contact with the edge-shaped portion (for example, a relatively sharp portion formed by an end portion of a plate portion or a corner portion of a column) of the body of the seat frame by using the inhibition portion of the mounting section.

According to the above aspect, the vehicle seat further includes a seat pad that forms a seat outer shape, and elastically supports an occupant. The seat pad may have a main portion in the center that allows an occupant to be seated, and a bolster located lateral to the main portion, when the seat pad is disposed on the body of the seat frame and covered with the seat cover, the bolster may be supported on the body of the seat frame, and the mounting section may be provided so as to be gradually inclined in a direction toward the bolster from the main portion as the mounting section is separated from the disposed place. In the above configuration, by employing a configuration in which the mounting section is inclined toward the bolster so as to minimally project to the main portion side, a configuration in which sinking of an occupant into the main portion is minimally obstructed is achieved.

According to the above aspect, the mounting section may have a first engagement portion with which the first webbing is engageable, and a second engagement portion with which the second webbing is engageable, and the engagement portions may be disposed in a side frame of the seat frame. In accordance with the above configuration, disengagement of an engagement member caused when the engagement member is pressed by an occupant can be suitably avoided.

In accordance with the above aspect, the respective end portions of the pair of webbings can be effectively mounted to the seat frame. In accordance with the above configuration, the respective end portions of the pair of webbings can be more effectively mounted to the seat frame. Moreover, in accordance with the above configuration, the disengagement of the engagement member caused when the engagement member is pressed by an occupant can be suitably avoided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
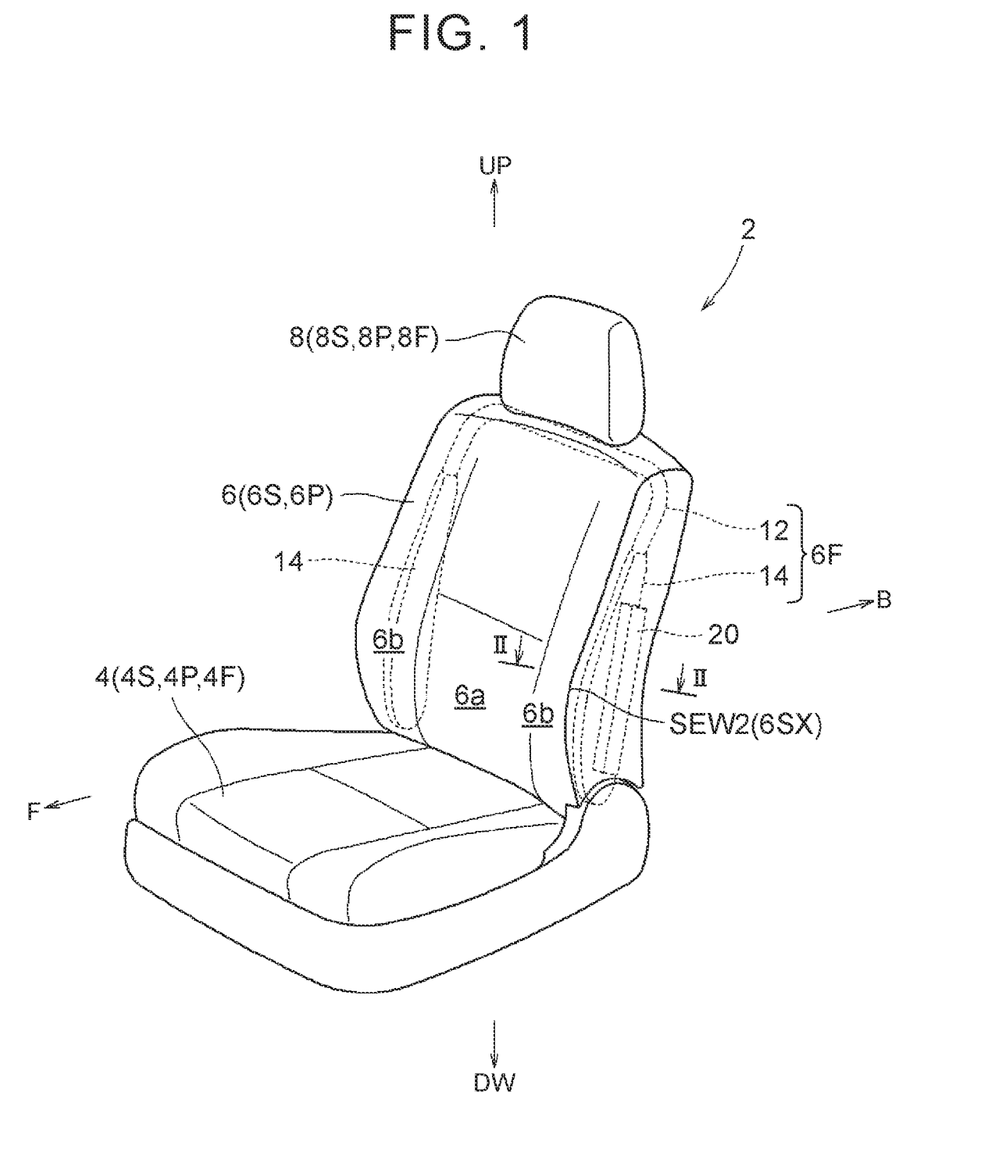
FIG. 1 is a perspective view of a vehicle seat.
Figure 2:
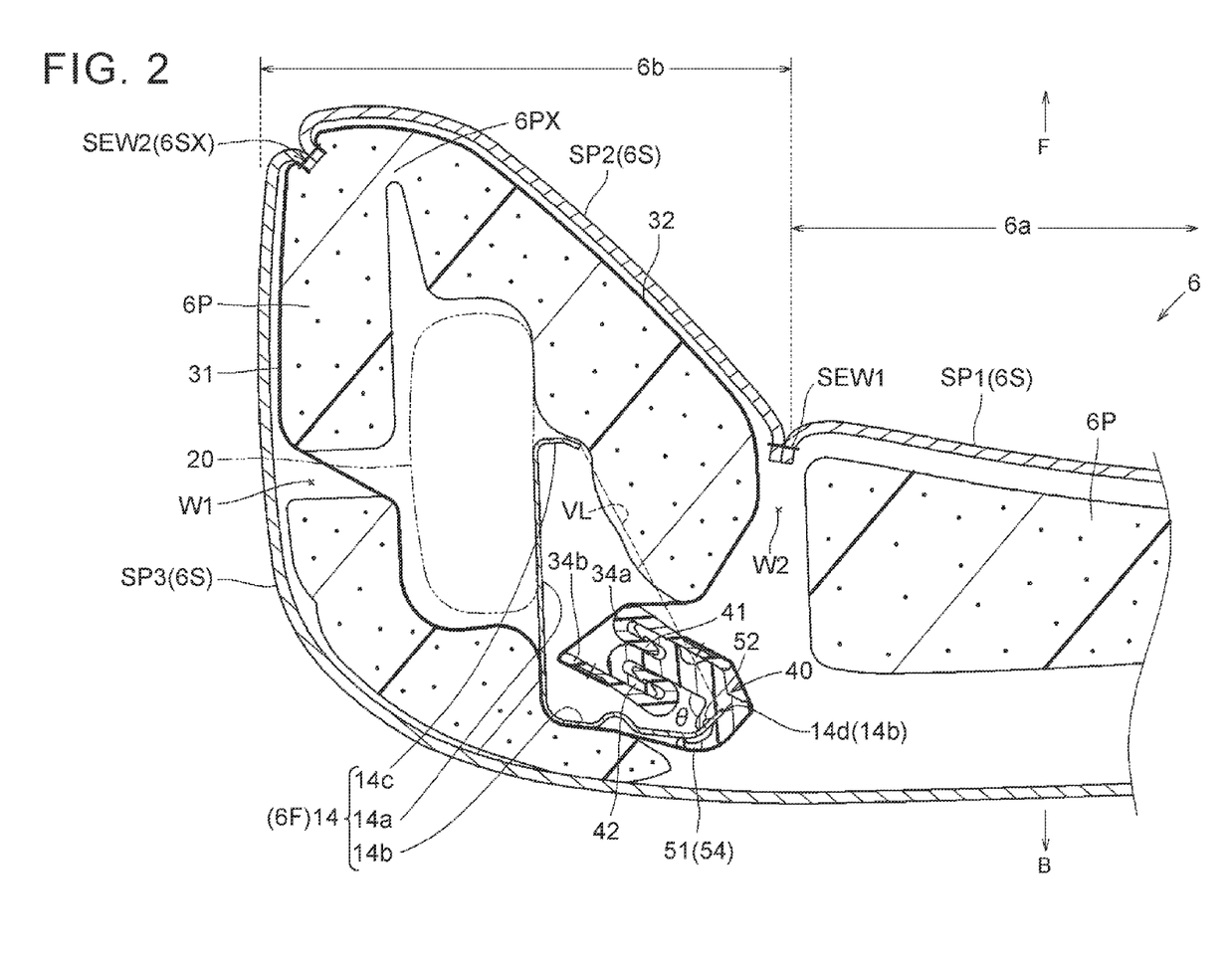
FIG. 2 is a partially enlarged sectional view of a seatback taken along a line II-II in FIG. 1.

Hereinafter, an embodiment of the invention will be described by reference to FIGS. 1 to 6. In FIGS. 1, 2, reference character F denotes a front side of a vehicle seat, reference character B a rear side of the vehicle seat, reference character UP an upper side of the vehicle seat, and reference character DW a lower side of the vehicle seat as appropriate. A vehicle seat 2 in FIG. 1 includes a seat cushion 4, a seatback 6, and a headrest 8. The seat cushion 4, the seatback 6, and the headrest 8 (seat constituent members) include seat frames 4F, 6F, 8F that form a seat framework, seat pads 4P, 6P, 8P that form a seat outer shape, and seat covers 4S, 6S, 8S that cover the seat pads, respectively. The seatback 6 is connected to a rear portion of the seat cushion 4 so as to be reclinable. The headrest 8 is disposed on an upper portion of the seatback 6 (in an upright state).

The seatback 6 includes a basic configuration (6F, 6P, 6S), an airbag 20, and a relevant configuration (a pair of webbings 31, 32, a rupture portion 6SX, a mounting section 40) (see FIGS. 1, 2; the respective components will be described in detail later). In an event of a vehicle collision, the airbag 20 is protruded out of the seat from a side portion (the rupture portion 6SX) of the seatback 6 to protect the side of an occupant. At this time, the airbag 20 is protruded out of the seat while partially rupturing the seat pad 6P to open the rupture portion 6SX.

By rupturing and opening the rupture portion 6SX by the pair of webbings 31, 32 (described in detail later), the airbag 20 is more surely protruded out from the rupture portion 6SX (see FIG. 2). At this time, the pair of webbings 31, 32 are provided so as to surround the airbag 20 on a back surface side of the seat cover 6S, and opposite end portions of each of the webbings 31, 32 are mounted to the seat cover 6S and the seat frame 6F, respectively. In this type of configuration, it is desirable that an end portion (the other end described later) of each of the webbings 31, 32 is effectively mounted to the seat frame 6F. Thus, the respective end portions of the pair of webbings 31, 32 are effectively mounted to the seat frame 6F by a configuration described later (the mounting section 40). Hereinafter, the respective configurations will be described in detail.

A body of the seat frame 6F (hereinafter sometimes referred to simply as the seat frame 6F) is an arch-shaped frame member, and can be formed from a material having excellent stiffness (metal, hard resin, or the like) (see FIGS. 1, 2). The seat frame 6F has an upper frame 12 (a pipe member having a substantially inverted-U shape) that forms an upper framework, and a pair of side frames 14 that form a side framework. Each of the pair of side frames 14 is a plate-shaped member (long in a vertical direction). The pair of side frames 14 are arranged facing each other in seat side portions based on the seatback upright state. Each of the side frames 14 has a substantially horizontal-U shape (in cross sectional view). A first bend portion 14b (a disposed place of the mounting section 40 described later), and a second bend portion 14c are formed at opposite ends of a body portion (14a) of each of the side frames 14 (see FIG. 2). The first bend portion 14b (relatively long) is disposed on the seat rear side, and an end portion (an edge-shaped portion 14d) of the first bend portion 14b projects toward a position where the first webbing 31 described later is disposed. The second bend portion 14c (relatively short) is disposed on the seat front side, and an end portion of the second bend portion 14c projects toward a back surface side of the seat pad 6P.

The seat pad 6P is a member that forms the seat outer shape, and can elastically support an occupant. For example, the seat pad 6P can be formed from foamed resin such as polyurethane foam (density: 10 kg/m$^3$ to 60 kg/m$^3$) (see FIG. 2). The seat pad 6P has a substantially rectangular shape (in front view), and has a main portion 6a, a bolster 6b (a protrusion portion 6PX), and slits W1, W2 (see FIG. 2). The main portion 6a is a flat portion in the center of the seat pad 6P, and allows an occupant to be seated therein (a backrest). The bolster 6b is a portion that projects to a seating side lateral to the main portion 6a, and can support the side of the occupant, for example, during cornering. The protrusion portion 6PX that is thinner-walled than another portion is formed on the seating side (close to a top portion) of the bolster 6b, and is arranged facing the rupture portion 6SX (described below) of the seat cover 6S. The slits W1, W2 that bring an inside and an outside of the seat pad 6P into communication are provided in a side portion of the bolster 6b and between the main portion 6a and the bolster 6b, respectively. The webbings 31, 32 (described later) are inserted through the slits W1, W2, respectively, such that the slits W1, W2 are located midway of the webbings 31, 32.

The seat cover 6S is a bag-shaped member that can cover the seat pad 6P, and has the rupture portion 6SX where the airbag 20 is protruded out (see FIGS. 1, 2). The seat cover 6S is formed by sewing a plurality of skin pieces (SP1 to SP3) together, and adjacent skin pieces are sewn together. Reference characters SEW1, SEW2 denote sewn portions. The first skin piece SP1 is a piece that covers the main portion 6a. The second skin piece SP2 is a piece that covers the seating side of the bolster 6b. The third skin piece SP3 is a piece that covers a side surface and a rear side of the bolster 6b. Examples of a material of the respective skin pieces include a fabric (a woven fabric, a knitted fabric, a non-woven fabric) made of natural fibers or synthetic fibers, and a leather (a natural leather, a synthetic leather). The rupture portion 6SX is a portion weaker than another portion of the seat cover, and ruptures and opens when the airbag 20 inflates. The rupture portion 6SX is the sewn portion SEW2 between the second skin piece SP2 and the third skin piece SP3, and extends in the seat vertical direction on the seating side (close to the top portion) of the bolster 6b (see FIG. 1).

Here, the airbag 20 (in an uninflated state) is a substantially cube-shaped member long in the seat vertical direction, and is disposed in the side portion of the seatback 6 (see FIGS. 1, 2). After the airbag 20 is fixed to the side frame 14 (the body portion 14a) by means such as bolting to be disposed on a seat side surface, the airbag 20 is covered with the seat pad 6P (the bolster 6b). Upon receiving an impact in the event of a vehicle collision, the airbag 20 is protruded out of the seat to thereby protect a body area, for example, from the breast to the waist of an occupant. Note that a gas supply device is disposed in the airbag 20. A gas generating agent or a high-pressure gas is sealed in the gas supply device (an inflator).

Figure 4:
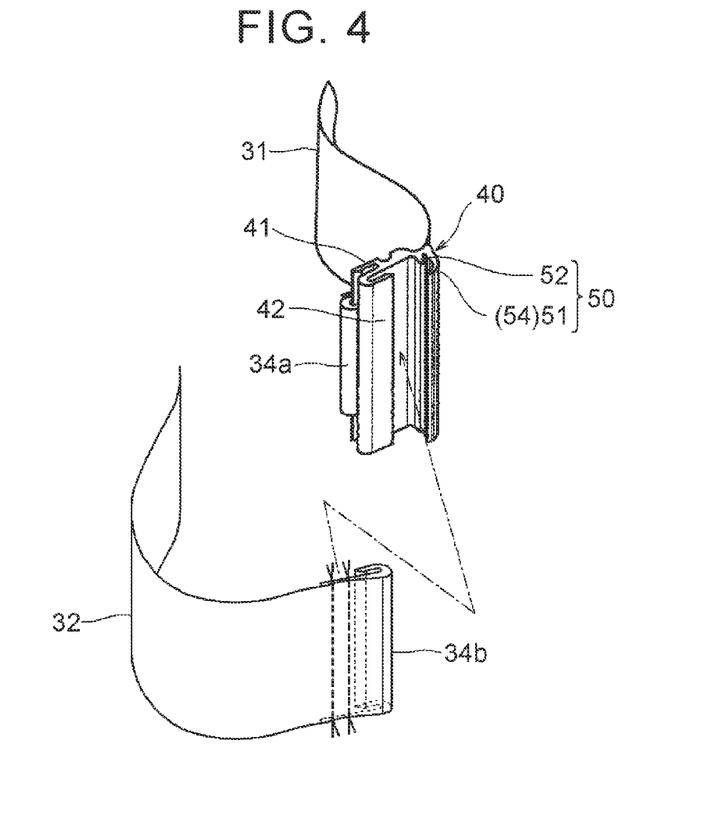
FIG. 4 is a partially exploded perspective view of the mounting section and webbings.
Figure 5:
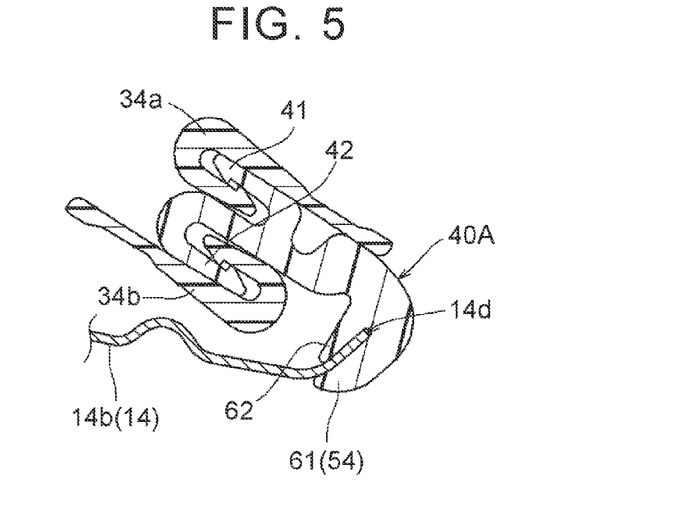
FIG. 5 is a partially enlarged sectional view of a mounting section and webbings according to Modification 1.
Figure 6:
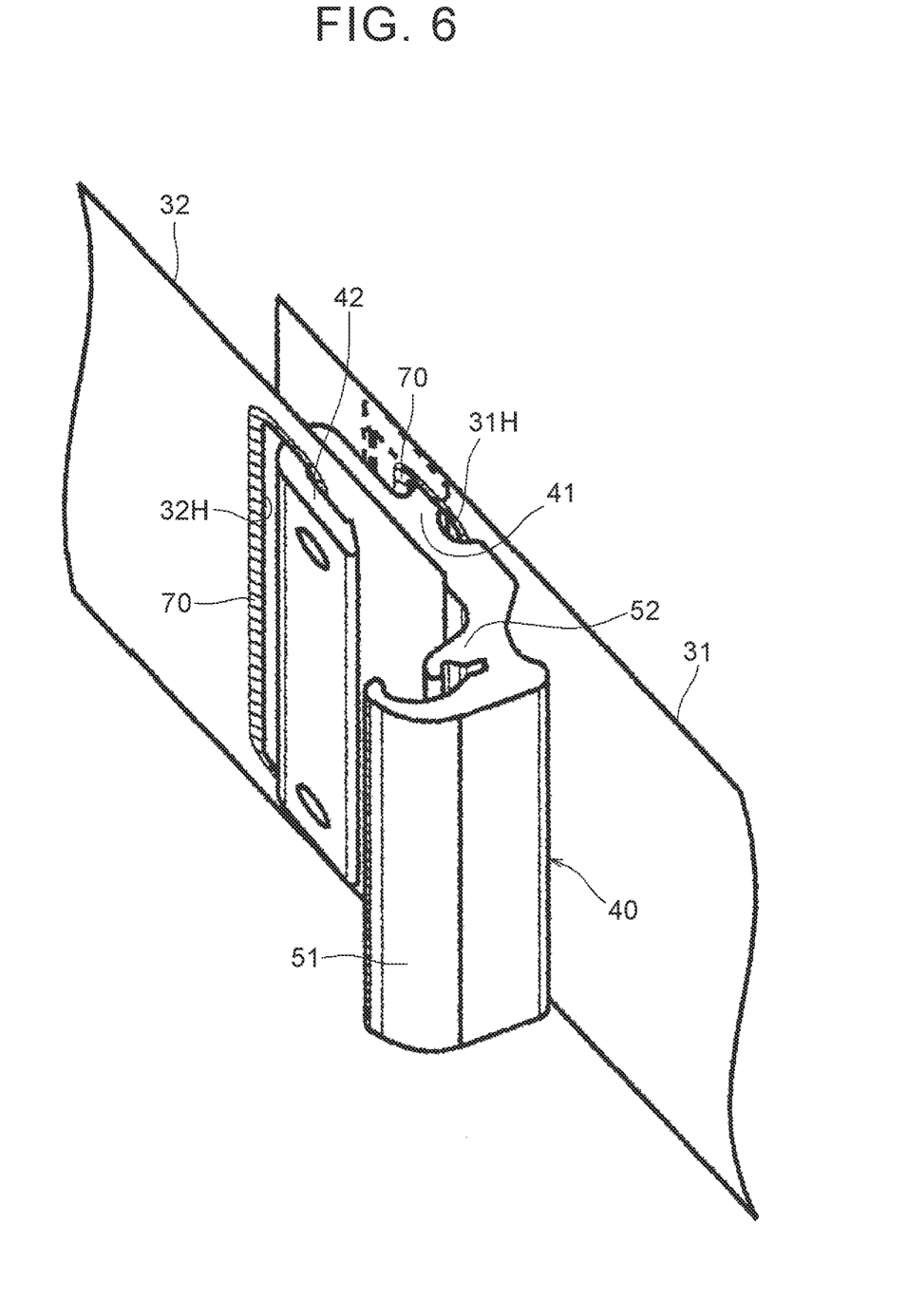
FIG. 6 is a partially enlarged perspective view of a mounting section and webbings according to Modification 2.

Each of the pair of webbings (the first webbing 31, the second webbing 32) is a band-shaped member (see FIGS. 2, 4). Although a material of the respective webbings 31, 32 is not particularly limited, the webbings 31, 32 preferably have strength large enough not to be damaged by the inflation (a pressure) of the airbag 20, and are typically made of a fabric that is less stretchable than the seat cover 6S. The webbings 31, 32 are sewn to the seat cover 6S on one end sides, and have engagement members 34a, 34b on the other end sides, respectively. Each of the engagement members 34a. 34b is a plate-shaped member (made of resin) having a substantially J shape in sectional view, and can be engaged with the mounting section 40 of the side frame 14 described below. The webbings 31, 32 are disposed so as to surround the air bag 20 on the back surface side of the seat cover 6S as described later. At this time, the one end sides of the webbings 31, 32 are mounted to the seating side of the seat cover 6S, and the other end sides (the engagement members 34a, 34b) are mounted to the first bend portion 14b of the side frame 14 via the mounting section 40 described below.

Figure 3:
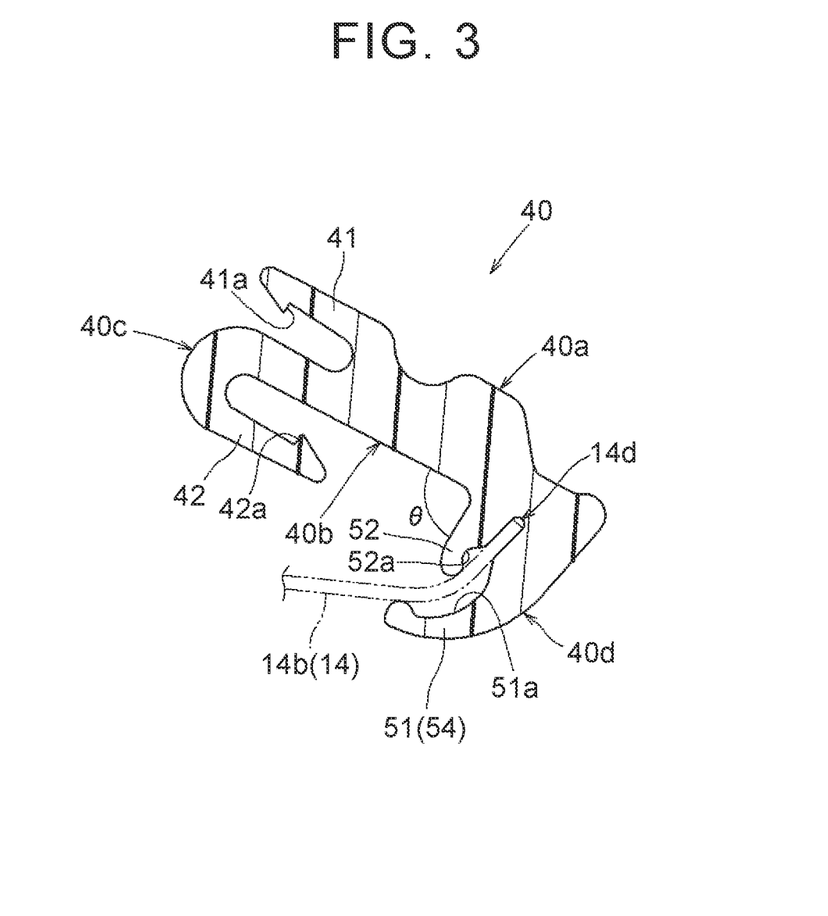
FIG. 3 is an enlarged sectional view of a mounting section.

The mounting section 40 is a configuration for use to mount the respective end portions (the respective other ends) of the pair of webbings 31, 32 to the first bend portion 14b of the side frame 14 (see FIGS. 2 to 4). The mounting section 40 is a plate-shaped resin member (having a substantially rectangular shape in front view), and has a pair of engagement portions (a first engagement portion 41, a second engagement portion 42), a grip portion (51, 52), and an inhibition portion 54. The first engagement portion 41 is a substantially L-shaped portion that projects from the mounting section 40 (on one surface 40a-side). The first engagement portion 41 is provided with a folded portion 41a at a distal end such that the other end (the engagement member 34a) of the first webbing 31 can be engaged with the first engagement portion 41 (see FIGS. 3, 4). The first engagement portion 41 is formed by causing an intermediate portion of the mounting section 40 (the one surface 40a) to project and bending the portion toward one end 40c of the mounting section 40. The second engagement portion 42 is a portion having substantially inverted-U shape (an outer surface has a curved shape) that is provided on the one end 40c-side of the mounting section 40. The second engagement portion 42 is provided with a folded portion 42a at a distal end such that the other end (the engagement member 34b) of the second webbing 32 can be engaged with the second engagement portion 42. The second engagement portion 42 is formed by curving a portion extending from the one end 40c of the mounting section 40 in a foldback shape on the other surface 40b-side.

The grip portion (51, 52) is a portion that can be mounted to the first bend portion 14b (the disposed place) of the side frame 14, and is formed on the other end 40d-side of the mounting section 40 (see FIGS. 2 to 4). The grip portion is a substantially U-shaped (in sectional view) portion at the other end of the mounting section 40, and has portions (a first grip portion 51, a second grip portion 52) into which the first bend portion 14b can be press-fitted. The first grip portion 51 and the second grip portion 52 have flexibility that enables deflection in directions away from each other, and are arranged facing each other with a smaller clearance than a thickness dimension of the first bend portion 14b therebetween. The first grip portion 51 is a relatively long plate-shaped portion, and is disposed on an outer surface side of the first bend portion 14b based on a mounted state of the mounting section 40. The second grip portion 52 is a relatively short plate-shaped portion, and is disposed on an inner surface side of the first bend portion 14b based on the mounted state. A recessed portion 51a (a thin-walled portion) is formed in an inner surface of the first grip portion 51, and a distal end side of the first grip portion 51 projects in a direction toward the second grip portion 52 (see FIG. 3). Similarly, a recessed portion 52a is formed in an inner surface of the second grip portion 52, and a distal end side of the second grip portion 52 projects toward the first grip portion 51. Note that the grip portion (51, 52) in the mounted state is allowed to slide in the vertical direction along the first bend portion 14b.

Here, the grip portion (51, 52) can be formed by bending a portion extending from the other end 40d of the mounting section 40 toward the other surface 40b (see FIGS. 2, 3). By appropriately adjusting a bend angle θ of the grip portion (51, 52), the one end 40c-side of the mounting section 40 is disposed appropriately apart from the side frame 14 in the mounted state described below (see FIG. 2). At this time, it is preferable to employ a configuration in which the mounting section 40 in the mounted state is disposed toward the side frame 14 so as to be prevented from excessively projecting to the main portion 6a-side. For example, in the mounted state of the mounting section 40, the mounting section 40 is disposed toward the side frame 14 so as to be gradually inclined in a direction toward the bolster 6b from the main portion 6a as the mounting section 40 is separated from the first bend portion 14b (the disposed place). At this time, it is preferable to dispose the respective engagement portions 41, 42 in the side frame 14 (on an inner side of the side frame 14 with respect to a virtual line VL connecting distal ends of the two bend portions 14b, 14c).

The inhibition portion 54 is a portion that inhibits contact between the end portion (the edge-shaped portion 14d) of the first bend portion 14b and the first webbing 31 (see FIGS. 2 to 4). The inhibition portion 54 is formed by a portion (particularly, the first grip portion 51 itself) on the other end 40d-side of the mounting section 40, and is disposed covering the end portion (the edge-shaped portion 14d) of the first bend portion 14*b* based on the mounted state of the mounting section 40. An outer surface of the inhibition portion 54 (the first grip portion 51) preferably has a shape with no edge-shaped portion so as not to damage the first webbing 31, and typically has a curved shape or a bent shape with R.

By reference to FIG. 2, the seat pad 6P is disposed on the seat frame 6F and is covered with the seat cover 6S, and the relevant configuration (the rupture portion 6SX, the protrusion portion 6PX, the respective webbings 31, 32, the mounting section 40) is disposed at appropriate positions. At this time, the main portion 6*a* is disposed on an inner side of the seat frame 6F, and the bolster 6*b* is disposed on the side frame (the second bend portion 14*c*) and supported thereon. With the airbag 20 mounted to the side frame 14 being covered with the bolster 6*b*, the protrusion portion 6PX is disposed in front of (on the seating side) the airbag 20. Subsequently, with the bolster 6*b* being covered with the seat cover 6S, the rupture portion 6SX (the sewn portion SEW2) is disposed close to the top portion of the bolster 6*b*.

Before a work described above, the pair of webbings 31, 32 are disposed so as to surround the airbag 20 on the back surface side of the seat cover 6S. At this time, the respective one end sides of the first webbing 31 and the second webbing 32 are disposed on the seating side of the seat cover 6S, and sewn together and mounted to the rupture portion 6SX (the sewn portion SEW2). The first webbing 31 is disposed along an outer side surface (an outer seat portion with respect to the airbag 20) of the bolster 6*b*, and is guided to the back surface side of the seat pad 6P from an intermediate position (the slit W1) of the outer side surface. The second webbing 32 is disposed along an inner side surface (an inner seat portion with respect to the airbag 20) of the bolster 6*b*, and is guided to the back surface side of the seat pad 6P from between the main portion 6*a* and the bolster 6*b* (the slit W2). Accordingly, the pair of webbings 31, 32 are disposed so as to surround the airbag 20, and the respective other end sides are guided to the rear side from the front side of the seat to be mounted to the side frame 14 (on the rear side). In this type of configuration, it is desirable that the respective other ends of the webbings 31, 32 are mounted to the side frame 14 effectively (for example, such that generation of abnormal noise and damage to the webbings can be suitably inhibited).

Thus, the respective other ends of the webbings 31, 32 are held apart from the seat frame 6F by the mounting section 40. That is, the one end 40*c*-side of the mounting section 40 is disposed in the side frame 14, and the first bend portion 14*b* of the side frame 14 is press-fitted into the other end 40*d*-side (the grip portions 51, 52) of the mounting section 40. At this time, the respective grip portions 51, 52 are deflected in the directions away from each other, and then restored to an original state, to thereby grip the first bend portion 14*b* while elastically pressing the first bend portion 14*b*. By gripping the first bend portion 14*b* by the two grip portions 51, 52 as described above, the mounting section 40 is mounted to the first bend portion 14*b* (the disposed place) of the side frame 14. The one end 40*c*-side (the respective engagement portions 41, 42) of the mounting section 40 is thereby disposed apart from the side frame 14.

While the first webbing 31 is pulled along the mounting section 40 from a rear surface side of the side frame 14, the engagement member 34*a* (the other end of the first webbing 31) is engaged with the first engagement portion 41. The engagement member 34*a* is engaged with the folded portion 41*a* of the first engagement portion 41 on a distal end side. At this time, the end portion (the edge-shaped portion 14*d*) of the first bend portion 14*b* is covered by the inhibition portion 54, so that contact with the first webbing 31 is suitably inhibited. Also, while the second webbing 32 is pulled into the side frame 14, the engagement member 34*b* (the other end of the second webbing 32) is engaged with the second engagement portion 42. The engagement member 34*b* is engaged with the folded portion 42*a* of the second engagement portion 42 on a distal end side in a direction opposite to the other engagement member 34*a*. Accordingly, the mounting section 40 is provided at the first bend portion 14*b* of the seat frame 6F, and the other ends of the pair of webbings 31, 32 are held apart from the seat frame 6F. Thus, since the side frame 14 and the other end of each of the webbings 31, 32 are disposed apart from each other during normal running (when the airbag is uninflated) or the like, generation of abnormal noise caused by contact therebetween can be suitably inhibited. Damage to the first webbing 31 by contact with the end portion (the edge-shaped portion 14*d*) of the first bend portion 14*b* can be also suitably inhibited by the inhibition portion 54 of the mounting section 40.

By reference to FIG. 2, the airbag 20 is protruded out of the seat to protect the side of an occupant in the event of a vehicle collision. At this time, the airbag 20 is protruded toward the seat cover 6S while inflating toward the seating side of the bolster 6*b* and breaking through the protrusion portion 6PX. The pair of webbings 31, 32 around the airbag 20 are strained, and the rupture portion 6SX is torn (opened), so that the airbag 20 is protruded out of the seat. At this time, the other ends of the pair of webbings 31, 32 are relatively firmly connected to the side frame 14 by the mounting section 40. Therefore, the strained state of each of the webbings 31, 32 is suitably maintained, and the rupture portion 6SX can be quickly torn into an open state (a configuration contributing to an increase in deployment speed of the airbag 20 is provided).

In the seat configuration described above, an occupant may be pressed against the main portion 6*a*, and sink into the seat pad 6P in the event of a vehicle collision. At this time, it is desirable that the members inside the seat (for example, the mounting section 40) minimally obstruct the sinking of the occupant. Thus, the mounting section 40 is provided so as to be gradually inclined in the direction toward the bolster 6*b* from the main portion 6*a* as the mounting section 40 is separated from the first bend portion 14*b* (the disposed place). By employing a configuration in which the mounting section 40 is inclined toward the bolster 6*b* so as to minimally project to the main portion 6*a*-side, a configuration in which the sinking of an occupant into the main portion 6*a* is minimally obstructed is achieved. By disposing the respective engagement portions 41, 42 in the side frame 14 (on the inner side with respect to the virtual line VL), disengagement of the engagement members 34*a*, 34*b* caused when the engagement members 34*a*, 34*b* are pressed by an occupant (for example, caused by contact with the sinking seat pad) can be suitably avoided.

As described above, the other ends of the pair of webbings 31, 32 are held apart from the seat frame 6F by the mounting section 40 provided at the seat frame 6F. Accordingly, it is possible to suitably suppress the generation of abnormal noise caused by contact and separation between the seat frame 6F and each of the end portions (for example, the engagement members 34*a*, 34*b*) of the webbings 31, 32 by using the mounting section 40. It is also possible to suitably suppress the contact of the first webbing 31 with the end portion (the edge-shaped portion 14*d*) of the first bend portion 14*b* by using the inhibition portion 54 of the mounting section 40. Furthermore, by employing the configuration in which the mounting section 40 is inclined toward the bolster 6b so as to minimally project to the main portion 6a-side, the configuration in which the sinking of an occupant into the main portion 6a is minimally obstructed is achieved. Therefore, the respective end portions of the pair of webbings 31, 32 can be effectively mounted to the seat frame 6F.

Here, various configurations may be employed as the configuration of the mounting section in addition to the above configuration. For example, in a mounting section 40A of Modification 1 shown in FIG. 5, an inner surface of a first grip portion 61 and an inner surface of a second grip portion 62 are substantially flat surfaces (the recessed portions are omitted). Therefore, it is possible to stably grip the first bend portion 14b by the grip portion (61, 62) (a configuration having excellent mounting stability is provided).

The other ends of the webbings 31, 32 can be directly engaged with the engagement portions 41, 42, respectively (without using the engagement members). For example, in Modification 2 shown in FIG. 6, hole portions 31H, 32H into which the engagement portions 41, 42 can be inserted, respectively, are formed at the other ends of the webbings 31, 32. The hole portions 31H, 32H are through-holes that pass through the webbings 31, 32, respectively, in a thickness direction of the webbings. A reinforcement member 70 (a ring-shaped metal member) is fitted to a periphery of each of the hole portions 31H, 32H. In the present modification, the other ends of the webbings 31, 32 can be stably engaged with the engagement portions 41, 42, respectively, without using the engagement members (a relatively simple configuration is provided).

The vehicle seat of the invention is not limited to the above embodiment, and various other embodiments may be employed. For example, although the configuration of the mounting section 40 (a shape, dimensions, a disposed position, the number of dispositions, etc.) has been described as an example, the description is not intended to limit the configuration of the mounting section. The mounting section 40 may be configured integrally with the seat frame. In this case, the mounting section may be made of metal. The mounting section holds the other ends of the webbings apart from the seat frame body (the body portion and the two bend portions). The mounting section may be also provided at an appropriate position (for example, at least one disposed place of the body portion, the first bend portion, and the second bend portion) of the seat frame in consideration of a position where the webbings are disposed or the like. The mounting section may project to the main portion side in the mounted state. By providing a hinge portion at an intermediate position of the mounting section, the mounting section may be deformed to be bent toward the seat frame when an occupant sinks into the main portion. Alternatively, by providing a weak point (a thin-walled portion) at an intermediate position of the mounting section, the mounting section may be broken while the occupant is sinking. The one end side of each of the webbings may be mounted to the rupture portion itself, or may be mounted to a periphery of the rupture portion as long as the rupture portion can be ruptured.

Although configurations of the engagement portions 41, 42, the grip portions 51, 52, and the inhibition portion 54 have been described as an example, the respective portions can be appropriately changed according to the seat configuration. For example, the configuration of the engagement portion can be appropriately changed according to a configuration of the end portion (the engagement member) of the webbing. The end portion of the webbing may be mounted so as not to be removable. The configuration of the grip portion can be also appropriately changed according to the seat frame. For example, the configuration in which a projecting portion may be provided on the grip portion, and inserted into and engaged with a hole portion of the seat frame can be adopted. The configuration of the inhibition portion can be also appropriately changed according to configurations of the seat frame and other respective portions. For example, the grip portion may be provided separately from the grip portion.

Although the configuration of the seat frame 6F has been described as an example, the description is not intended to limit the configuration of the seat frame 6F. For example, in a case of a columnar seat frame, a corner portion of the columnar seat frame is used as the edge-shaped portion. The configuration of the grip portion of the mounting section can be appropriately changed such that the columnar seat frame can be held according to a shape of the columnar seat frame.

The configuration of the vehicle seat 2 (the seat constituent members, the airbag, etc.) can be also appropriately changed. For example, the airbag can be disposed at an appropriate position of the seat constituent members. Also, the configuration of the webbing (a shape, dimensions, a disposed position, the number of dispositions, etc.) can be appropriately changed according to the position where the airbag is disposed or the like. Although the invention has been described by using only the seatback as an example, the configuration of the present embodiment can be applied to various seat constituent members such as the seat cushion. The configuration of the present embodiment can be also applied to general vehicle seats of vehicles, aircrafts, trains, or the like.

What is claimed is:

1. A vehicle seat comprising:
a seat frame that defines a seat framework;
a seat cover that covers the seat frame, the seat cover including a rupture portion;
an airbag that is disposed in the seat;
a first webbing and a second webbing that surround the airbag on a back surface side of the seat cover, one end side of each of the first and second webbings being mounted to the rupture portion; and
a mounting section that mounts an other end side of each of the first and second webbings to the seat frame, wherein
in an event of a vehicle collision, the airbag is configured to protrude out of the seat by rupture of the rupture portion due to a strain of the first and second webbings and an inflation of the airbag,
the mounting section is provided at a body of the seat frame,
when the airbag is uninflated, the mounting section holds the other end side of each of the first and second webbings apart from the body of the seat frame, and
an inner surface of the first webbing extends along and is in contact with an outer surface of an inhibition portion of the mounting section that inhibits contact between an edge-shaped portion provided in the body of the seat frame and each of the first and second webbings, and
the other end side of the second webbing is disposed between a portion of the first webbing and the other end side of the first webbing in a seat width direction.

2. The vehicle seat according to claim 1, wherein the portion of the first webbing is provided between the end sides of the first webbing.

3. The vehicle seat according to claim 1, wherein
the mounting section has a first engagement portion with which the first webbing is engageable, and a second engagement portion with which the second webbing is engageable, and
the engagement portions are disposed in a side frame of the seat frame.

4. The vehicle seat according to claim 3, wherein
the first webbing and the second webbing each include an engagement member disposed at the other end side of the respective webbing, and
the engagement member of the first webbing is configured to engage with the first engagement portion and the engagement member of the second webbing is configured to engage with the second engagement portion.

5. The vehicle seat according to claim 4, wherein each engagement member defines a J-shape.

* * * * *